Jan. 14, 1969  G. L. ARDOINO  3,421,373

FLUID FLOW METERING SYSTEM

Filed April 12, 1967  Sheet 1 of 2

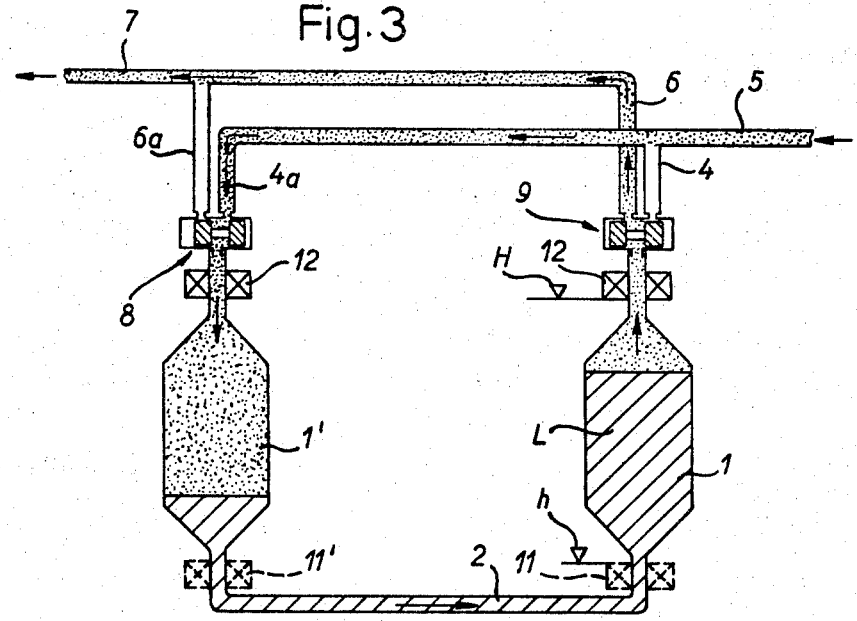
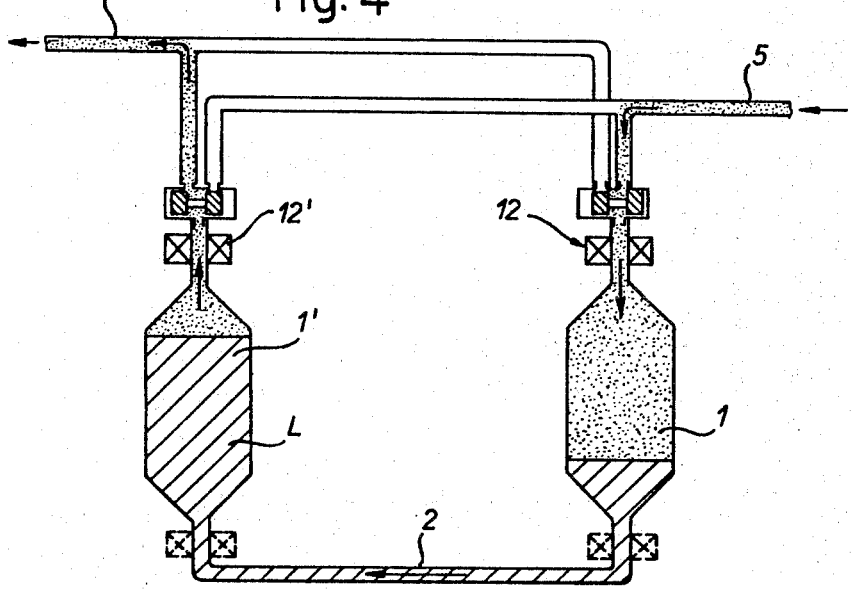

United States Patent Office 3,421,373
Patented Jan. 14, 1969

3,421,373
FLUID FLOW METERING SYSTEM
Gian Luigi Ardoino, Turin, Italy, assignor to Fiat Societa per Azioni, Turin, Italy
Filed Apr. 12, 1967, Ser. No. 630,318
Claims priority, application Italy, Apr. 12, 1966, 9,153/66
U.S. Cl. 73—219          8 Claims
Int. Cl. G01f 1/00

ABSTRACT OF THE DISCLOSURE

The invention is concerned with flowmeters for fluids, and particularly for liquids such as petrol. The invention includes one or two containers of carefully graduated volume which contain a separating fluid. A valve arrangement is responsive to the level of the separating fluid in a said container by means of suitable detectors. A fluid to be measured is introduced into a said container until all the separating fluid has been expelled therefrom and until such a state is detected by a detector. The valve arrangement then automatically changes its state and the separating fluid is returned to the container causing the expulsion of the fluid therefrom. As will be evident the number of times that the said container is filled with fluid will provide a direct indication of the volume of fluid that has passed. The detectors may give a direct readout of this by operating a counter.

---

Figure 1:
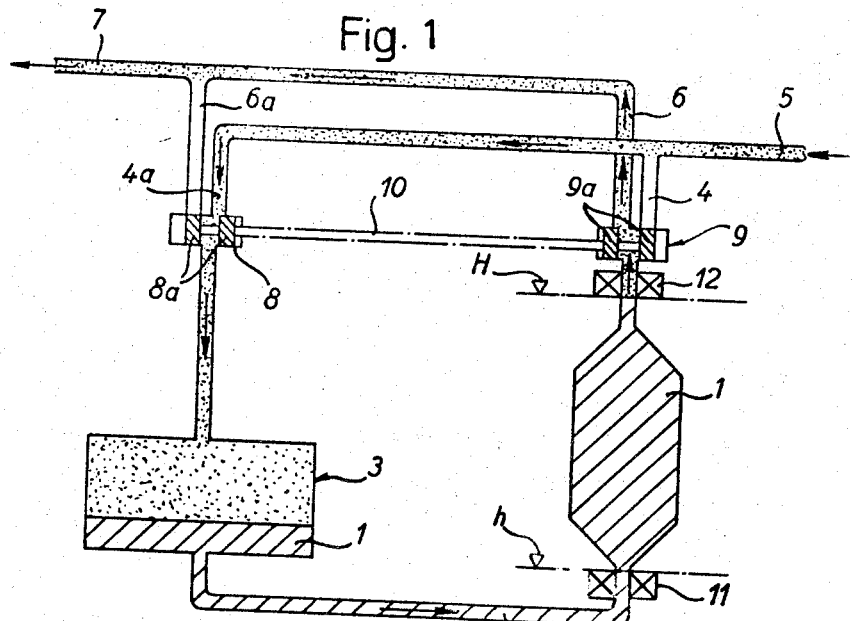

The invention relates generally to a flowmeter for fluids and more particularly to a flowmeter for a liquid.

It is the main object of the invention to provide a highly accurate fluid flowmeter, more particularly a flowmeter for a liquid, which will measure the delivery of a fluid during a given period of time. Such a meter may be used to ascertain the fuel consumption of a combustion engine under trial or testing.

It is a further object to provide an accurate flowmeter which operates with a volumetric measure, which either measures a unit of volume, or measures and registers consecutive strictly constant units of volume, these units having flowed during the given period of time.

A still further object of the invention is to provide a device which automatically registers a said consecutive volume unit whenever the volume of fluid being measured reaches a predetermined value in the said container, and wherein, moreover, fractions of volume units occupied by the fluid in the container are directly readable.

Another object of the invention is to provide a continuously operating flowmeter of the type referred to above, which meter effects measurement and registration of the consecutive delivered volume units without interruption of fluid delivery.

Further objects of the invention are to provide a device of the aforementioned nature which is simple in structure, reliable in operation and capable of promptly supplying direct readings which require no subsequent data processing.

According to these and other objects the invention consists in a flowmeter comprising at least one calibrated container of known volume connected with a receptacle at least of equal volume and both the said container and receptacle being each connected by conduits to a supply of fluid to be measured and an outlet for the said fluid, a separating liquid being contained in the container and receptacle and arranged to be transferable from one to the other by the fluid being measured, and detectors being provided for directly or indirectly sensing the level of the separating liquid in the container, valve means being provided which are responsive to the readings of the said detectors to alternate between opening of a fluid outlet and closure of a fluid supply on the said container with closure of a fluid outlet and opening of a fluid supply on the said receptacle and the reciprocal arrangement thereby alternately to expel therefrom a fluid quantity corresponding to the volume of the container.

In practice the said "fluid supply" and "fluid outlet" will generally be constituted respectively by a fluid supply such as a petrol tank or the like receptacle for fluid to be measured and a fluid consumption device such as an engine carburetor: This statement is not of course intended to be limiting of the scope of the invention.

Preferably, two detectors are provided, one each at the top and bottom of the said container.

According to a modification of the invention the device is provided with two graduated containers equal in volume, each container being provided with a single level detector which may be arranged at the top or bottom end thereof.

Each container is advantageously in the from of a graduated burette, and is made of transparent material for direct vision of the fraction of the volume unit which may be contained therein at the end of a measurement period.

Figure 2:
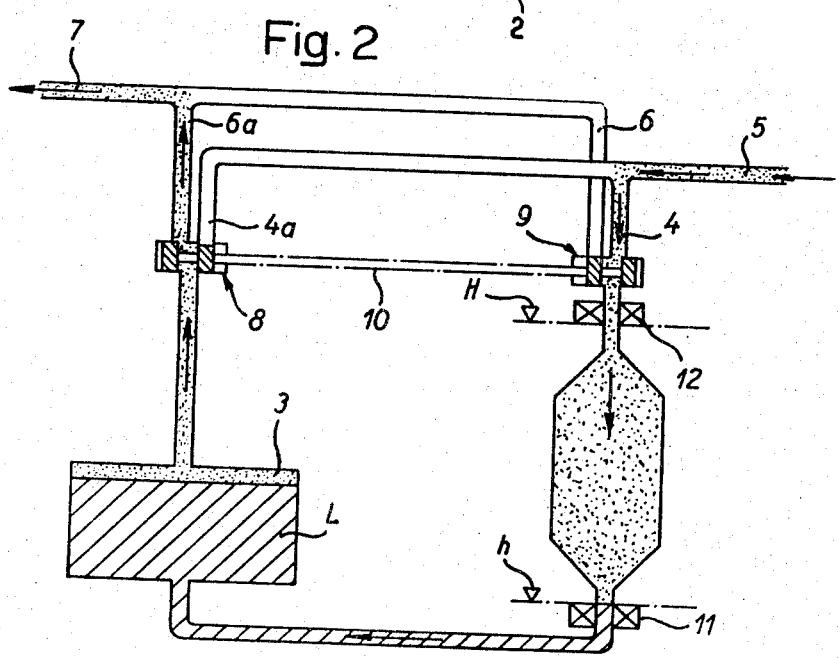

These and other objects and advantages of the invention will be clear from the following description, given with reference to the accompanying drawings which are by way of example and in which:

FIGURE 1 is a diagrammatical view of a flowmeter according to the invention at one operating stage;
FIGURE 2 is a similar view to FIG. 1 showing the meter at another operating stage, and
FIGURES 3 and 4 are diagrammatical views similar and generally corresponding to FIGS. 1 and 2, respectively, showing a modified embodiment according to the invention.

In FIGS. 1 and 2, there is shown a calibrated container 1, which may be graduated and is advantageously in the form of a burette of transparent material. The volume of the container 1, as defined between two level sights at the bottom and top thereof $h$, $H$, respectively, is accurately known and represents a basic counting unit for the volumes of the fluid being measured.

The container 1 is provided at its bottom end with a conduit 2 which connects it with a receptacle 3 of capacity at least equal to the container and advantageously of larger capacity than the container.

A liquid L is contained in the container 1 and receptacle 3 and this liquid will be referred to hereafter as the "separating liquid" L. The density of this separating liquid L is sharply differentiated from the density of the fluid being measured, the liquid L being immiscible with the latter and being in practice, for instance, mercury. The quantity of separating liquid may be varied at will, but in any case is such that a sufficient volume of the said liquid L can be transferred through conduit 2 to the receptacle 3 to empty the container 1 from its top level $H$ to its bottom level $h$.

Advantageously, the quantity of separating liquid corresponds to the capacity of the receptacle 3.

In accordance with the invention, the container 1 and receptacle 3 are provided at their top ends each with a supply conduit for the fluid being measured these conduits being referenced 4, 4a, respectively and branched from a main conduit 5. The container and receptacle are also provided each with a discharge conduit 6, 6a, respectively, leading to a main conduit 7. The conduits 4, 6 and 4a, 6a are selectively and alternately connected with the inside of their respective container 1 and receptacle 3 through interconnected valve means. This latter means is arranged to effect opening of the discharge conduit and closure of the supply conduit for the container 1 and at the same time as there is effected opening of the supply conduit and closure of the discharge conduit for the receptacle 3 and vice-versa.

The valve means are advantageously electrovalves 8, 9 provided respectively with distributing shutters 8a, 9a which are simultaneously operable. These electrovalves are controlled by level detectors 11, 12 which are responsive to the presence of the separating liquid L at the above-mentioned levels h, H.

In a meter as described the fluid being measured flows from the conduit 5, which is, for instance, a pipe supplying petrol to the carburetor of an engine, and is initially fed to the receptacle 3 as shown in FIGURE 1. At this stage of use electrovalve 8 has its shutter 8a so arranged as to intercept the discharge conduit 6a and keep the supply conduit 4a open. The fluid being measured displaces from the receptacle 3 the separating liquid L and transfers it to the container 1 from level h to level H. As indicated above the electrovalve 9 will automatically initially have its shutter 9a so arranged as to intercept the conduit 4 and open the conduit 6 so that the separating liquid rising in the container 1 will expel any of the fluid being measured, in this case petrol, which is in the container 1. The petrol will, as shown, pass to the carburetor via the conduit 7.

On reaching the level H the separating fluid operates the detector 12 and this exchanges the positions of the shutters of the electrovalves 8, 9 thereby connecting the container 1 with the supply conduit 5 and the receptacle 3 with the discharge conduit 7. This stage is illustrated in FIG. 2. The petrol now admitted to the container 1 forces the separating liquid L therefrom and into the receptacle 3, the separating liquid expelling the previously accumulated petrol from the receptacle 3 and into the conduit 7. This transfer continues until the level of separating liquid in the container 1 sinks to the bottom level h and upon reaching this level it activates, the detector 11 which again exchanges the positions of the shutters 8a, 9a to re-establish the supply of petrol to the receptacle 3. This is of course the stage shown in FIG. 1.

Alternate transfer of the separating liquid from the container 1 to the receptacle 3 and vice-versa continues during the whole measurement period and whenever the separating liquid reaches the bottom or top levels of the container 1 the detectors 11 and 12 supply, in addition to the pulse operating the electrovalves, a pulse for registering, on any suitable counter, the transfer of a further volume unit.

Measurement of delivery can be effected by calculating the ratio of a single volume unit to the time which elapses between two consecutive flows of a similar said unit. Alternatively, in order to obtain a given average value, the ratio of the unit volumes and any volume fractions, delivered to the time employed for their delivery may be calculated.

In the embodiment shown in FIGS. 3 and 4, wherein similar or corresponding parts are denoted by the same reference numerals as in the preceding figure, the meter includes with two containers or calibrated burettes 1, 1', of equal volume. Each container 1, 1' equipped with a single level detector which may be arranged either at the top level H thereof as denoted by 12 and 12' or at the bottom level thereof h as denoted by 11 and 11' respectively.

This embodiment functions in exactly the same manner as that of FIGS. 1 and 2 except, of course, that the sensings of the levels of separating fluid are effected by whichever detectors are provided, it being evident that either of the combinations suggested will allow the required level sensings to be made. This is advantageously used when it is required accurately to evaluate the residual volume fractions, and hence the volumes and volume fractions delivered during a measurement period.

Various modifications of the invention are of course possible within the scope of the appended claims.

What we claim is:
1. A fluid flow metering system comprising:
 (a) a calibrated container having an inlet and an outlet;
 (b) a receptacle having an inlet and an outlet;
 (c) a conduit interconnecting the container outlet with the receptacle outlet;
 (d) a separating liquid which is immiscible with and denser than the fluid to be metered, said liquid being contained within the container, receptacle and conduit and being transferrable between the container and the receptacle through the conduit;
 (e) a fluid supply conduit;
 (f) a fluid delivery conduit;
 (g) electrically operated valve means having a first position interconnecting said fluid supply conduit with said container inlet and interconnecting said fluid delivery conduit with said receptacle inlet and having a second position interconnecting said fluid supply conduit with said receptacle and interconnecting said fluid delivery conduit with said container inlet; and
 (h) electrical coil means separated from the fluid in said metering system and responsive to immediate proximity of said separating fluid by displacement of said separating liquid for causing said electrically operated valve means to assume its first position when the liquid level of said separating fluid is at a predetermined upper level in said container and for causing said valve means to assume its second position when said liquid level is at a predetermined lower level in said container, whereby in operation successive metered volumes of fluid are discharged into the delivery conduit by positive displacement of the separating liquid under the action of fluid pressure in the supply conduit.

2. A fluid flow metering system as defined in claim 1 wherein said supply and delivery conduits are connected through said valve means to the upper ends of said container and said receptacle.

3. A fluid flow metering system as defined in claim 1 wherein said electrical coil means includes a first coil at the top of said container and a second coil at the bottom of said container.

4. A fluid flow metering system as defined in claim 1 wherein said receptacle is similar to and of equal volume as said container, said electrical coil means including a first coil on said container and a second coil on said receptacle.

5. A fluid flow metering system as defined in claim 1 wherein said separating liquid is mercury.

6. A fluid flow metering system as defined in claim 1 wherein said valve means comprises a pair of electrovalves, each provided with distributing shutters which are simultaneously operable.

7. A fluid flow metering system as defined in claim 4 wherein said first and second coils are positioned at the top of said container and at the top of said receptacle, respectively.

8. A fluid flow metering system as defined in claim 4 wherein said first and second coils are positioned at the bottom of said container and at the bottom of said receptacle, respectively.

References Cited

UNITED STATES PATENTS 2,325,695   8/1943   McAfee _____ 73—219

FOREIGN PATENTS 225,694   12/1959   Australia.

JAMES J. GILL, *Primary Examiner.*

R. S. SALZMAN, *Assistant Examiner.*